(12) United States Patent
Yoda

(10) Patent No.: US 6,744,934 B2
(45) Date of Patent: *Jun. 1, 2004

(54) METHOD, APPARATUS AND RECORDING MEDIUM FOR GENERATING AN IMAGE FILE HAVING HIERARCHICAL IMAGE DATA REPRESENTING A PLURALITY OF STILL IMAGES HAVING DIFFERENT DISPLAY DIMENSIONS

(75) Inventor: Akira Yoda, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,647

(22) Filed: Jul. 23, 1999

(65) Prior Publication Data

US 2003/0113037 A1 Jun. 19, 2003

(30) Foreign Application Priority Data

Jul. 23, 1998 (JP) ............................................. 10-208111

(51) Int. Cl.$^7$ .............................. G06K 9/54; G06K 9/60
(52) U.S. Cl. ..................... 382/305; 707/104.1; 715/514
(58) Field of Search ................................. 382/240, 305; 707/101, 102, 104.1, 514, 530; 715/514, 530

(56) References Cited

U.S. PATENT DOCUMENTS 6,205,457 B1 * 3/2001 Hurwitz .................... 707/104.1
6,237,010 B1 * 5/2001 Hui et al. .................... 345/581
6,272,558 B1 * 8/2001 Hui et al. .................... 709/328

* cited by examiner

Primary Examiner—Timothy M. Johnson
(74) Attorney, Agent, or Firm—Birch, Stewart, Kolasch & Birch, LLP

(57) ABSTRACT

When a group of still images are reproduced interactively, reproduction wait time to confirm the content of the images can be shortened. Image data representing the group of still images including the still images photographed from various viewpoints are formed into a hierarchy and recorded in an image file. A first layer has image data representing an index image comprising images viewed from 4 points whose resolution is ¼ of that of the original image. A second layer has hierarchical image data representing images viewed from 16 points and having a resolution which is ½ of the original image resolution. A third layer has hierarchical image data having the same resolution as the original image and viewed from 36 points. Upon reproduction, the hierarchical image data are reproduced from the first layer.

25 Claims, 4 Drawing Sheets

F I G. 2
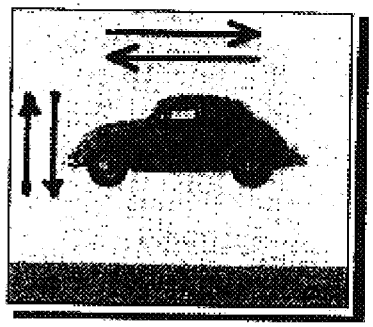
F I G. 3
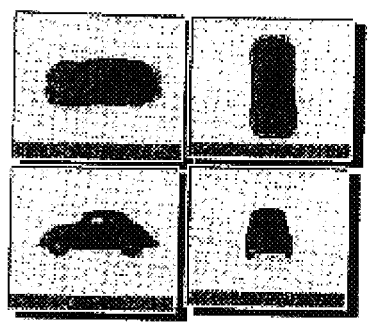
F I G. 4
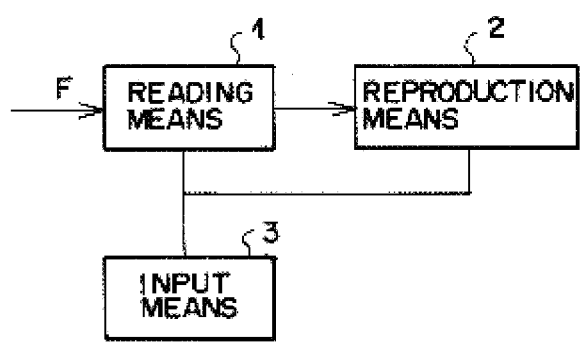

METHOD, APPARATUS AND RECORDING MEDIUM FOR GENERATING AN IMAGE FILE HAVING HIERARCHICAL IMAGE DATA REPRESENTING A PLURALITY OF STILL IMAGES HAVING DIFFERENT DISPLAY DIMENSIONS

BACKGROUND OF THE INVENTION

1. Field of the Invention

The present invention relates to a method and an apparatus for generating an image file storing a group of image data sets representing a group of still images photographed in such a manner that 2-dimensional coordinates, a viewpoint, and the like thereof are different for each image, and to a method and an apparatus for progressively reproducing the image file, as well as to a computer-readable recording medium storing a program to cause a computer to execute these methods.

2. Description of the Related Art

As a method for realistically representing an image of a scene or of an object, a method of interactive reproduction of a group of still images comprising images whose spatial relationships to each other have been predetermined is known. For example, for a group of still images obtained by photographing an object from multiple directions at an equal angle interval, an image with a changing viewpoint can be reproduced interactively by reproducing a still image first and by specifying a direction of rotation of the object with a mouse or the like. For a group of still images obtained by photographing with a focal point changing gradually from the near distance to the far distance, objects in the near and far distances can be displayed clearly by interactively changing the focal point. As has been described above, a group of still images can be reproduced interactively when the group of still images are obtained by changing display dimensions in various ways, such as changing a viewpoint at the time of photographing up and down, right and left, and back and forth, or changing a focal point, or changing an interval of photographing a moving object.

Meanwhile, as a format for storing image data, various formats such as JPEG, GIF, and TIFF have been known. According to another format proposed recently, image data are decomposed into a hierarchy based on resolution or density resolution and data at each layer of the hierarchy (hierarchical data) are stored after coding and compression thereof. More specifically, according to this storage format, image data are decomposed into hierarchical data according to multiple resolutions or density resolutions through wavelet transform or the like carried out thereon, and the hierarchical data at each resolution or density resolution are coded and compressed according to the hierarchy and saved in a file.

This storage format has the following characteristics:

(1) Unlike a DCT (Discrete Cosine Transform) method used in the conventional JPEG format, no artifacts such as block distortion are created, since image data are not processed in blocks.
(2) Only resolution information which is necessary upon transfer of image data needs to be transferred, since the image data have been coded hierarchically. This enables efficient image transfer.
(3) Various kinds of image processing such as frequency enhancing processing can be carried out comparatively easily, since image data are decomposed into data at multiple resolutions or multiple density resolutions.
(4) Simultaneous decomposition of space and frequency according to multiple-resolution analysis is possible. In a low frequency range wherein coding efficiency is greatly affected, an orthogonal transform is carried out in a wide range, whereas in a high frequency range, an orthogonal transform is possible in a narrow range. Therefore, even when quantization noise near an edge of an image is generated, spatial spread of the noise can be suppressed. As a result, the noise is not easy to perceive.

Like a FlashPix file proposed by Eastman Kodak Co., a file format enabling storage of data sets having different characteristics in a file has also been proposed. Hierarchical data decomposed into multiple resolutions or density resolutions can be stored in such a file according to the FlashPix standard.

When image data comprising hierarchical images, such as in the above-described format file or a FlashPix standard file, are displayed on a monitor or the like, data transfer to the monitor and image reproduction on the monitor is carried out from a low resolution or low density resolution (hereinafter, simply expressed as resolution) to high resolution. This is called progressive transfer (or progressive reproduction in the case of reproduction). When the data transferred progressively are displayed on a monitor, an entire low resolution image is displayed first, and images with gradually improving clarity are reproduced in accordance with increasing resolution of the data.

By interactively reproducing a group of still images as has been described above, reproduced images can be provided with reality and liveliness. However, image data representing such a group of still images have a substantially large amount of information and transfer thereof is not efficient. For example, when a group of still images are generated by photographing an object from viewpoints all around the object, in order to reproduce the images smoothly, angular resolutions of at least 60 divisions and 15 divisions in horizontal and vertical directions respectively are necessary. Therefore, at least 900 angular display dimensions are necessary, and the amount of the image data thus becomes 900 times that of a still image. Therefore, when all images in the group of still images are transferred and reproduced, interactive display of the images is time-consuming. Furthermore, by transferring and reproducing the still images frame by frame, the content of the image can be understood to some degree, but the group of still images cannot obtain the interactive characteristic which the image group should have, until all the images are transferred.

SUMMARY OF THE INVENTION

The present invention has been created based on consideration of the above problems. An object of the present invention is to provide a method and an apparatus for generating an image file to enable reduction in reproduction wait time when a group of still images such as the one described above are interactively reproduced, and a method and an apparatus for progressively reproducing the image file, as well as a computer-readable recording medium storing a program to cause a computer to execute the methods.

An image file generating method of the present invention is a method of generating an image file storing a group of image data sets representing a group of still images comprising a plurality of still images having predetermined spatial relationships to each other, and the method comprises the steps of:

obtaining hierarchical image data in each hierarchical layer by forming the group of image data sets into a hierarchy in such a manner that the number of display dimension divisions in one hierarchical layer is larger than that of a preceding layer; and storing the hierarchical data in each hierarchical layer in the image file.

"Having predetermined spatial relationships to each other" means that changes in a viewpoint, a focal point, a position on the move, a resolution, and the like of an object included in the group of still images are interactively reproducible, as in the case where the object is viewed from different positions, or have different focal points, photographing intervals, or resolutions.

The "display dimension" means a dimension used upon interactive reproduction of the group of still images, and the viewpoint position, the focal point position, the photographing interval, the resolution and the like can be listed as the dimension. Not only 1 display dimension but also a plurality of display dimensions can be used.

The phrase that "the number of display dimension divisions in one hierarchical layer is larger" means that at least one of the numbers of the viewpoints, the focal points, the photographing intervals, the resolutions, and the like is larger than the number of display dimension divisions of the preceding hierarchical layer. In this specification, "having a higher display dimension" means that the number of display dimension divisions is large.

Out of the image data in each hierarchical layer, it is preferable for hierarchical image data having a smallest number of display dimension divisions to be composed of image data of an image or an image group representing the group of still images.

It is also preferable for the image data in each hierarchical layer to be obtained by relating corresponding images in each hierarchical layer.

When a still image in one hierarchical layer is considered, a plurality of still images corresponding to the still image exist in a subsequent display dimension. Therefore, "relating the corresponding images in each hierarchical layer" means to relate the still image at the hierarchical layer with the plurality of still images corresponding to the still image in the subsequent display dimension.

It is also preferable that a plurality of the display dimensions are set.

The phrase that "a plurality of the display dimensions are set" means that the group of still images are set to have any different display dimensions out of the viewpoints, the focal points, the photographing intervals, the resolutions, and the like describe above, for example.

An image reproducing method of the present invention is a method of progressively reproducing an image file generated according to the image file generating method of the present invention, and the image data are reproduced from hierarchical image data having a smallest number of display dimension divisions out of the hierarchical image data in each hierarchical layer.

In the case where corresponding images at each hierarchical layer are related to each other, it is preferable for the image data to be reproduced from those having the smallest number of display dimension divisions out of the hierarchical data, and at the time hierarchical image data having a predetermined display dimension are reproduced, hierarchical image data to be reproduced after the predetermined dimension and related to an image specified in the predetermined dimension are preferably reproduced in priority to the other image data.

It is preferable for the hierarchical image data to be reproduced based on a pre-set display dimension, in the case where the plurality of display dimensions are set.

An image file generating apparatus of the present invention is an apparatus for generating an image file storing a group of image data sets representing a group of still images comprising a plurality of still images having predetermined spatial relationships to each other, and the image file generating apparatus comprises:

hierarchy forming means for obtaining hierarchical image data in each hierarchical layer by forming the group of image data sets into a hierarchy in such a manner that the number of display dimension divisions in one hierarchical layer is larger than that of a preceding layer; and recording means for storing the hierarchical data at each hierarchical layer in the image file.

It is preferable for the hierarchy forming means to obtain the image data in each hierarchical layer in such a manner that image data in a hierarchical layer having a smallest number of display dimension divisions are composed of image data of an image or an image group representing the group of still images.

It is also preferable for the hierarchy forming means to obtain the image data in each hierarchical layer by relating corresponding images in each hierarchical layer.

It is also preferable for the hierarchy forming means to obtain the image data in each hierarchical layer by setting a plurality of the display dimensions.

An image reproducing apparatus of the present invention comprises reproduction means for progressively reproducing an image file generated by the image file generating apparatus of the present invention and the reproduction means reproduces image data in an order starting from hierarchical image data having a smallest number of display dimension divisions out of the hierarchical image data.

In the case where the image file generating apparatus generates the hierarchical image data by relating corresponding images in each hierarchical layer, it is preferable for the reproduction means to reproduce the image data from the hierarchical image data having the smallest number of display dimension divisions out of the hierarchical data, and at the time hierarchical image data having a predetermined display dimension are reproduced, hierarchical image data to be reproduced after the predetermined dimension and related to an image specified out of the images in the predetermined dimension are preferably reproduced in priority to the other image data by the reproduction means.

It is preferable for the reproduction means to reproduce the hierarchical image data in each hierarchical layer based on a pre-set display dimension, in the case where the image file generating apparatus generates the hierarchical image data by setting a plurality of display dimensions.

The processing carried out in the image file generating method and in the image file reproducing method may be provided as a program recorded in a computer-readable recording medium to cause a computer to execute the processing.

According to the present invention, an image file is generated by forming a hierarchy of the image data sets representing a group of still images so that the image data sets have different display dimension divisions. When the display dimension of image data in a hierarchical layer is low, the amount of image data in the layer is comparatively small. Therefore, in the case where the image file is progressively reproduced from the hierarchical image data having the low display dimension, the display dimension is low at an early stage of reproduction, but enables earlier confirmation of the content of an image represented by the image file than in the case where the entire image data sets are transferred. Furthermore, although the number of display dimension divisions is small at an early stage, images can be reproduced having some degree of interactive characteristic, since the early stage hierarchical data includes a plurality of still images having different display dimensions.

Moreover, by forming the hierarchical image data having the smallest number of display dimension divisions from image data representing the group of still images, the time necessary for confirmation of the content of an entire reproduced image can be further shortened, since the content of the image file can be confirmed immediately at the time the hierarchical image data are reproduced.

When the corresponding image data in each hierarchical layer are related to each other, by specifying an image out of still images in a predetermined dimension reproduced at one stage, images related to the specified image can be reproduced in priority to the other images having dimensions larger than that of the specified image. In this manner, a desired image can be reproduced earlier than the others, and users' needs can be met.

BRIEF DESCRIPTION OF THE DRAWINGS

FIG. 2 is an illustration showing a car as a subject;

FIG. 3 is an illustration showing an index image of the car;

FIG. 4 is a block diagram showing an outline configuration of an image reproducing apparatus according to the embodiment;

DESCRIPTION OF THE PREFERRED EMBODIMENTS

Hereinafter, embodiments of the present invention will be explained with reference to the accompanying drawings.

Figure 1:
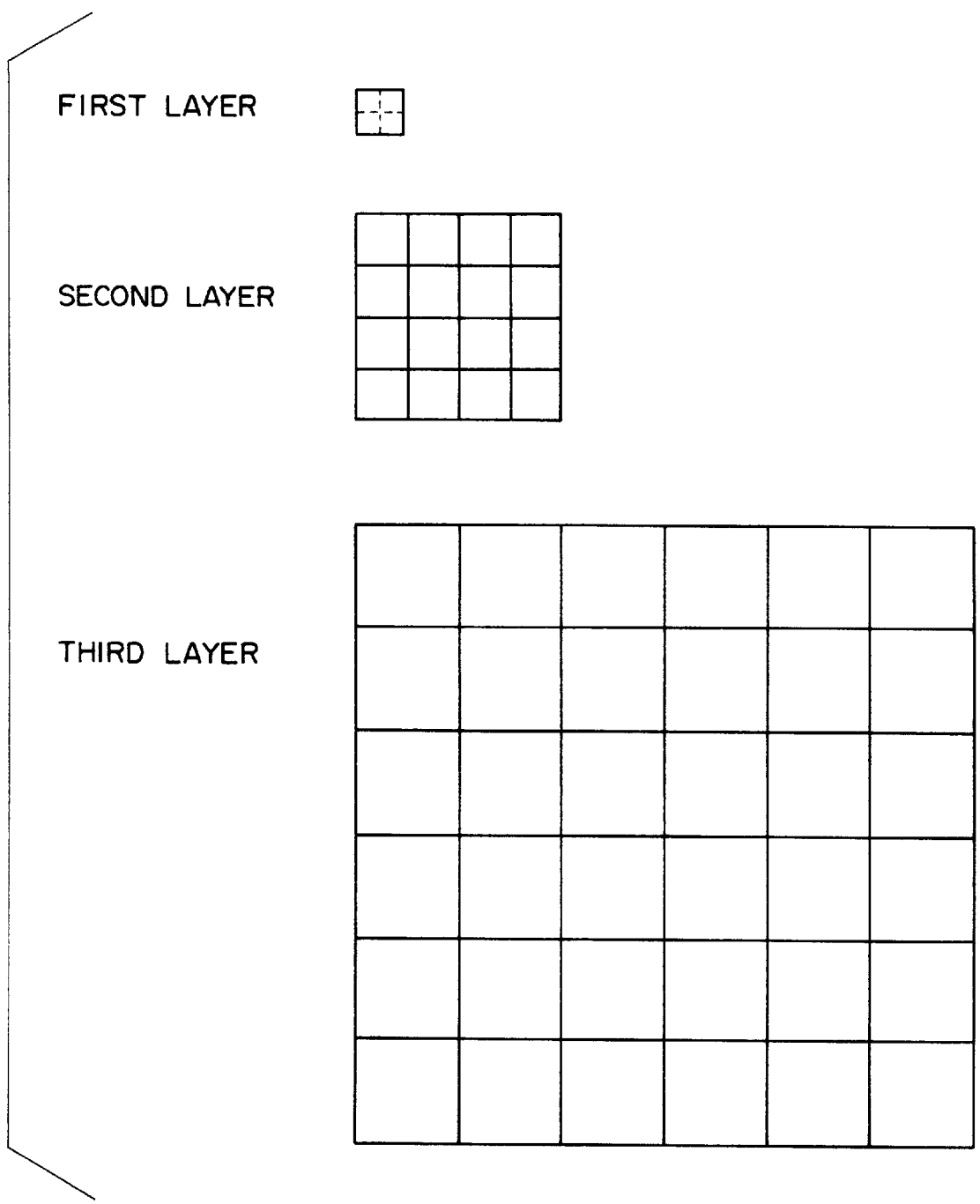
FIG. 1 is a diagram showing a structure of an image file generated according to an embodiment of an image file generating method of the present invention.

FIG. 1 is a diagram showing an outline structure of an image file generated according to a first embodiment of an image file generating method of the present invention.

As shown in FIG. 1, the image file generated according to the first embodiment has a car shown in FIG. 2 as a subject, and is obtained by forming a hierarchy of original image data representing a group of still images comprising 36 original still images obtained by photographing the subject from 36 viewpoints. A first layer comprises hierarchical image data representing an index image of the car viewed from 4 viewpoints shown in FIG. 3 and having a resolution of R/4 which is ¼ of an original image resolution R. A second layer comprises hierarchical image data representing images of the car viewed from 16 points and a resolution of the images is reduced to 2/R which is ½ of the original image resolution R. A third layer comprises hierarchical image data representing the images of the car viewed from 36 points and having the original resolution R. An image file F generated in this manner is recorded in an image server, and transferred to a user via a network, or provided to a user by being recorded in a portable recording medium.

FIG. 4 is a block diagram showing an outline configuration of an image reproducing apparatus for reproducing the image file F generated in the above manner. As shown in FIG. 4, the image reproducing apparatus according to this embodiment comprises reading means 1 for reading the image file F transferred via the network or recorded in the recording medium, reproduction means 2 such as a monitor for progressively reproducing the image file F in a manner which will be explained later, and input means 3 such as a mouse and a keyboard for inputting various instructions to the reading means 1 and to the reproduction means 2.

Figure 5:
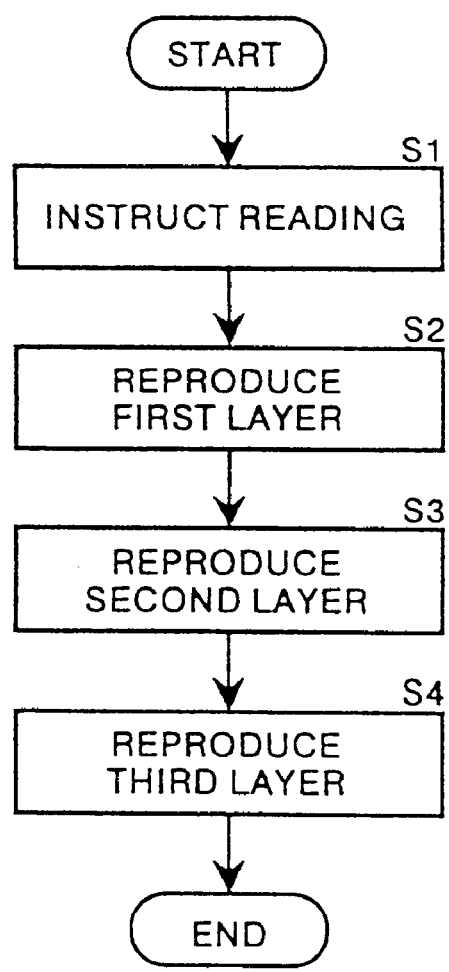
FIG. 5 is a flow chart showing processing carried out by the image reproducing apparatus of the present invention.

Processing carried out in the image reproducing apparatus will be explained next. FIG. 5 is a flow chart showing the processing carried out in the image reproducing apparatus according to this embodiment. A user inputs an instruction to read the image file F by using the input means 3 (step S1). The reading means 1 starts reading the image file F in response to the instruction. First, the reading means reads the hierarchical data in the first layer and reproduces the index image (see FIG. 3) represented by the first layer image data on the reproduction means 2 (step S2). At this stage, the resolution is ¼ of the original resolution. However, the user can confirm the content of the image file F by viewing the image reproduced on the reproduction means 2. The reading means 1 then reads the image data in the second layer and reproduces the images on the reproduction means 2 (step S3). At this stage, images whose resolution is ½ of the original one can be reproduced from 16 viewpoints. The user can rotate the car in a virtual manner in directions shown by arrows in FIG. 2 by displaying images from different viewpoints one by one by inputting an instruction to change the viewpoints with the input means 3. At this stage, since the number of viewpoints is only 16, the viewpoint movement is awkward. Therefore, it is preferable for the reproduction means 2 to reproduce the images by generating interpolated images through interpolation of the viewpoints.

The reading means 1 reads the third layer image data and reproduces the image data on the reproduction means 2 (step S4). At this stage, since the original still images having 36 viewpoints and the resolution R can be reproduced, the user can change the viewpoint in 36 ways by inputting an instruction with the input means 3. The car can rotate in the directions shown by the arrows in FIG. 2.

As has been described above, in this embodiment, image data representing a group of still images are formed in a hierarchy and the image data file F is progressively reproduced from lower display dimension image data. Therefore, the content of the image can be understood earlier than in the case where image groups are transferred at one time.

Furthermore, since still images viewed from a certain number of points can be displayed at a stage where display dimension is low, images having some degree of interactive characteristic can be reproduced.

By selecting any one of the 4 images included in the index image at the stage of the first-layer index image display in the above-described first embodiment by using the input means 3, image data related to the selected image in the second or higher layer may be read in priority to the other images. For example, when a frontal view of the car has been selected from the index image, images related to this frontal view image in the second or later layer are read in priority to the other images. By reading images related to the specified image in priority to the others in this manner, an image from a desired viewpoint can be reproduced prior to the others and the user's need can be met.

Figure 6:
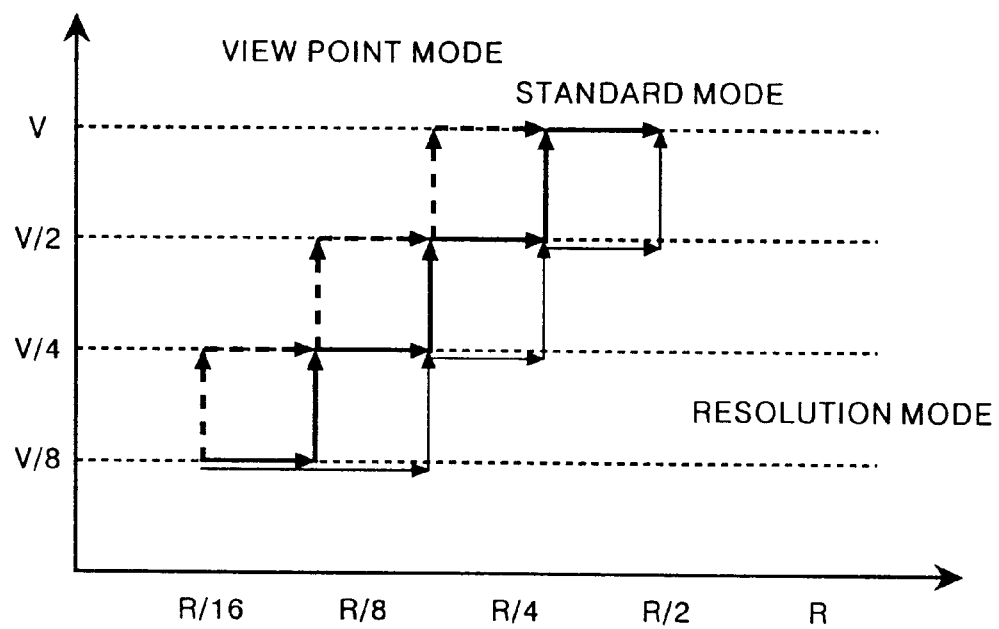
FIG. 6 is a diagram explaining processing in a second embodiment.

A second embodiment of the present invention will be explained next. FIG. 6 is a diagram for explaining processing in the second embodiment. In the second embodiment, the resolution and the number of viewpoints of the images to be read are changed in accordance with a user's request. In the second embodiment, a maximum number of viewpoints is expressed by V, and a highest resolution is denoted by R. The image file F is composed of original image data formed into a hierarchy of 20 layers having 5 steps of resolution namely R, R/2, R/4, R/8, and R/16 each having 4 steps of viewpoint namely V, V/2, V/4, and V/8. Upon reading the image file F formed in the above manner, 3 reading modes, namely a standard mode, a viewpoint mode, and a resolution mode are available.

When the viewpoint mode is selected, hierarchical image data having the R/16 resolution and V/8 viewpoints are read first. Thereafter, hierarchical image data having the R/16 resolution and V/4 viewpoints, the R/8 resolution and V/4 viewpoints, the R/8 resolution and V/2 viewpoints, the R/4 resolution and V/2 viewpoints, the R/2 resolution and V viewpoints, and the R resolution and V viewpoints are read in this order. In this manner, the reproduction means 2 progressively reproduces images progressively in such manner that the number of the viewpoints grows earlier than the resolution.

When the resolution mode has been selected, hierarchical image data at the R/16 resolution and having V/8 viewpoints are read first. Thereafter, the hierarchical image data having the R/8 resolution and V/8 viewpoints, the R/4 viewpoints, the V/8 viewpoints, the R/4 resolution and V/4 viewpoints, the R/2 resolution and V/4 viewpoints, the R/2 resolution and V/2 viewpoints, the R resolution and V/2 viewpoints, and R resolution and V viewpoints are read in this order. In this manner, the reproduction means 2 progressively reproduces images having the resolution increasing earlier than the number of the viewpoints.

In the case where the standard mode has been selected, image data at the R/16 resolution and having V/8 viewpoints are read first. Thereafter, the hierarchical image data having the R/8 resolution and V/8 viewpoints, the R/8 resolution and V/4 viewpoints, the R/4 resolution and V/4 viewpoints, the R/4 resolution and V/2 viewpoints, the R/2 resolution and V/2 viewpoints, the R/2 resolution and V viewpoints, and the R resolution and V viewpoints are read in this order.

In the above-described first and second embodiments, a group of still images having changing viewpoints and resolutions have been used. However, a group of still images having changing viewpoints only or changing resolution only may be used. Alternatively, a group of still images comprising still images having changing focal points may be used. In this case, the still images are generated by photographing a subject with changing N focal points, and a first layer has image data representing an index image at the R/16 resolution and including N/4 images. A second layer has hierarchical image data representing images having N/2 focal points and at the R/4 resolution, while a third layer has hierarchical image data representing images of N focal points and at the N resolution.

A plurality of still images generated by photographing a moving object at a predetermined interval may be used as the still image group. In this case, consecutive photographs photographed at an interval of P frames/sec and for t seconds are generated. A first layer has an index image including t/2 frames of images at the R/8 resolution. A second layer has hierarchical image data representing tP/10 frames of images at the R/4 resolution. A third layer has hierarchical image data representing tP/3 frames of images at the R/2 resolution. A fourth layer has hierarchical image data representing tP frames of images at the resolution R. The values of t/2, tp/10 and tp/3 may not be integers. If such values are not integers, integers closest to the real values will be assigned to represent t/2, tp/10 and tp/3. In this case, the hierarchical image data at the layers second or higher can be reproduced interactively, or reproduced automatically at a predetermined frame feeding rate. A user can specify a frame in the second or higher layer to be transferred in priority to the others, by viewing the index image at the first layer. In this manner, an outline of the group of still images can be confirmed in a short time and a desired scene can be reproduced by specifying it.

What is claimed is:

1. A method of generating an image file storing a group of image data sets representing a group of still images comprising a plurality of still images of a single subject having different user-interactive display dimensions, the method comprising the steps of:

obtaining hierarchical image data in each hierarchical layer by forming the group of image data sets into a hierarchy in such a manner that the number of user-interactive display dimension divisions in one hierarchical layer is larger than that of a preceding layer; and storing the hierarchical data in each hierarchical layer in the image file, wherein said user-interactive display dimensions are a resolution and at least one of a viewpoint position, a focal point position, and a photographing interval.

2. A computer-readable recording medium storing a program to cause a computer to execute a method of generating an image file storing a group of image data sets representing a group of still images comprising a plurality of still images of a single subject having different user-interactive display dimensions, the program comprising procedures of:

obtaining hierarchical image data in each hierarchical layer by forming the group of image data sets into a hierarchy in such a manner that the number of user-interactive display dimension divisions in one hierarchical layer is larger than that of a preceding layer; and storing the hierarchical data in each hierarchical layer in the image file, wherein said user-interactive display dimensions are a resolution and at least one of a viewpoint position, a focal point position, and a photographing interval.

3. A computer-readable recording medium as claimed in claim 2, wherein the procedure of obtaining the hierarchical image data is a procedure of obtaining the hierarchical image data in such a manner that image data in a hierarchical layer having a smallest number of user-interactive display dimension divisions out of the hierarchical image data in each hierarchical layer is composed of image data of an image or an image group representing the group of still images.

4. A computer-readable recording medium as claimed in claim 2, wherein the procedure of obtaining the hierarchical image data is a procedure of obtaining the hierarchical image data in each hierarchical layer by relating corresponding images in each hierarchical layer.

5. A computer-readable recording medium as claimed in claim 2, wherein the procedure of obtaining the hierarchical image data is a procedure of obtaining the hierarchical image data by setting a plurality of the user-interactive display dimensions.

6. An apparatus for storing a group of image data sets representing a group of still images comprising a plurality of still images of a single subject having different user-interactive display dimensions, the apparatus having a file structure comprising:

a plurality of hierarchical layers, in each of which a portion of the plurality of still images is stored, wherein said hierarchical layers are set such that images having a greater number of user-interactive display dimension divisions than a preceding layer are stored in each hierarchical layer, and wherein said user-interactive display dimensions are a resolution and at least one of a viewpoint position, a focal point position, and a photographing interval.

7. The apparatus according to claim 6, wherein hierarchical image data having a smallest number of user-interactive display dimension divisions out of the hierarchical image data in each hierarchical layer is composed of image data of an image or an image group representing the group of still images.

8. The apparatus according to claim 6, wherein the hierarchical image data in each hierarchical layer is obtained by relating corresponding images in each hierarchical layer.

9. A computer-readable recording medium storing a program to cause a computer to execute a method of progressively reproducing the image file generated by the apparatus according to claim 8, wherein the program comprises a procedure of reproducing the hierarchical image data from hierarchical image data having a smallest number of user-interactive display dimension divisions out of the hierarchical image data, and at the time hierarchical image data having a predetermined user-interactive display dimension is reproduced, hierarchical image data to be reproduced after the predetermined dimension and related to an image specified in the predetermined dimension is reproduced in priority to the other image data.

10. The apparatus according to claim 6, wherein a plurality of the user-interactive display dimensions are set.

11. A computer-readable recording medium storing a program to cause a computer to execute a method of progressively reproducing an image file generated by the apparatus according to claim 10, wherein the program has a procedure of reproducing the hierarchical image data starting from hierarchical image data having a smallest number of user-interactive display dimension divisions out of the hierarchical image data in each hierarchical layer.

12. A computer-readable recording medium storing a program to cause a computer to execute a method of progressively reproducing the image file generated by the apparatus according to claim 10, wherein the program comprises a procedure of reproducing the hierarchical image data based on a pre-set user-interactive display dimension.

13. A method of reproducing an image file generated with the apparatus according to claim 6, wherein image data is reproduced from hierarchical image data having a smallest number of user-interactive display dimension divisions out of the hierarchical image data in each hierarchical layer.

14. A method of reproducing an image file generated with the apparatus according to claim 6, wherein the image data is reproduced from the image data having the smallest number of user-interactive display dimension divisions out of the hierarchical data, and at the time hierarchical image data having a predetermined user-interactive display dimension is reproduced, hierarchical image data to be reproduced after the predetermined dimension and related to an image specified at the predetermined dimension is reproduced in priority to the other image data.

15. A method of reproducing an image file generated with the apparatus according to claim 6, wherein the hierarchical image data is reproduced based on a pre-set user-interactive display dimension.

16. An image reproducing apparatus comprising reproduction means for progressively reproducing an image file generated with the apparatus according to claim 6, wherein the reproduction means reproduces the hierarchical image data in an order starting from hierarchical image data having a smallest number of user-interactive display dimension divisions out of the hierarchical image data.

17. An image reproducing apparatus comprising reproduction means for progressively reproducing an image file generated with the apparatus according to claim 6, wherein the reproduction means reproduces the image data from hierarchical image data having the smallest number of user-interactive display dimension divisions out of the hierarchical data, and at the time hierarchical image data having a predetermined user-interactive display dimension is reproduced, the reproduction means reproduces hierarchical image data to be reproduced after the predetermined dimension and related to an image specified out of images in the predetermined dimension in priority to the other image data.

18. An image reproducing apparatus comprising reproduction means for progressively reproducing an image file generated with the apparatus according to claim 6, wherein the reproduction means reproduces the hierarchical image data in each hierarchical layer based on a pre-set user-interactive display dimension.

19. The apparatus according to claim 6, wherein the user-interactive display dimensions are accessible in each of said hierarchical layers.

20. The apparatus according to claim 19, wherein a user, via an input, accesses the user-interactive display dimensions in each of said hierarchical layers.

21. A method of transferring image data, the method comprising:
    organizing a plurality of still images into hierarchical layers such that each hierarchical layer has a greater number of display dimension divisions and a greater resolution than the preceding hierarchical layer;
    transferring each hierarchical layer; and
    receiving each hierarchical layer,
    wherein upon receipt of each hierarchical layer, the display dimension divisions in each of said hierarchical layers are interactively available to a user.

22. The method according to claim 21, wherein the display dimension divisions comprises at least one of a viewpoint position, a focal point position, and a photographing interval.

23. The method according to claim 21, wherein the display dimension divisions are interactively associated with each of the plurality of still images in each hierarchical layer.

24. The method according to claim 21, wherein the display dimension divisions in each of said hierarchical layer is interactively available to the user prior to the transfer of a final hierarchical layer.

25. The method according to claim 21, wherein a transfer priority for transferring each of the plurality of still images in each hierarchical layer is based on the display dimension division associated with each of the plurality of still images in each hierarchical layer.

* * * * *